May 3, 1955
H. C. MORRIS
2,707,540
FRICTION CLUTCH
Filed Feb. 27, 1951
3 Sheets-Sheet 3
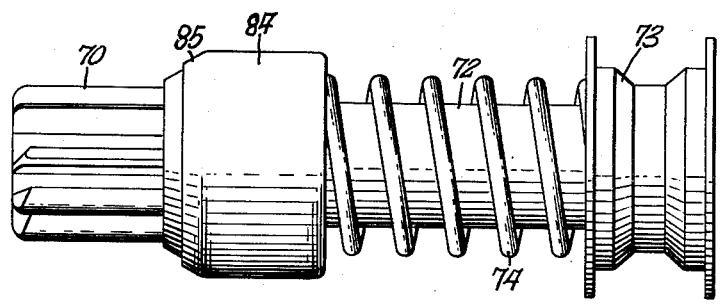
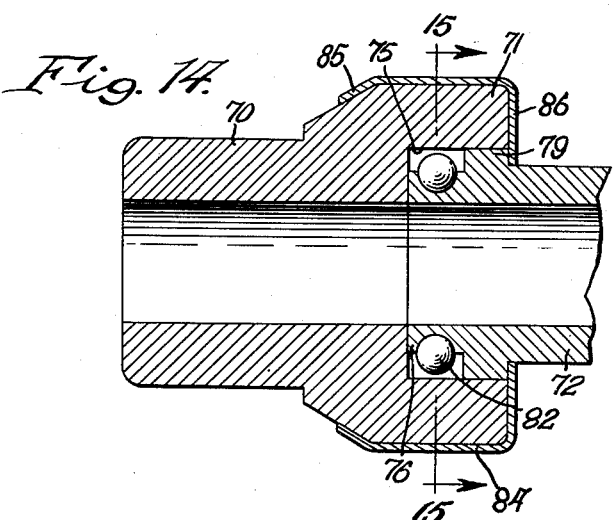
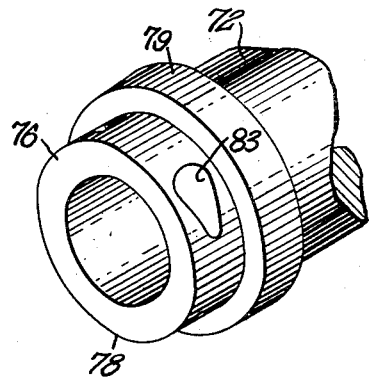
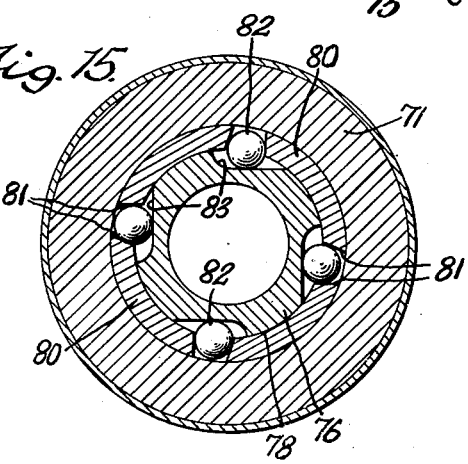
INVENTOR.
Harry C. Morris
BY Popp and Sommer
Attorneys.

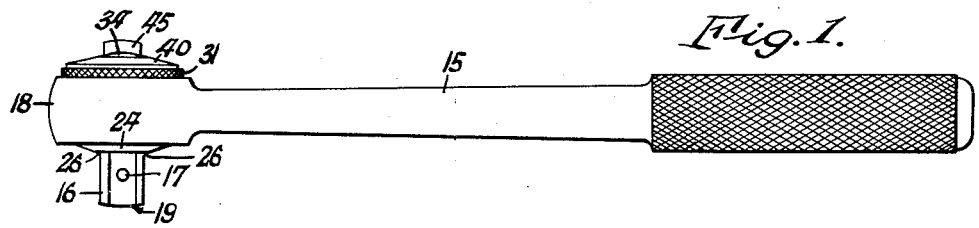
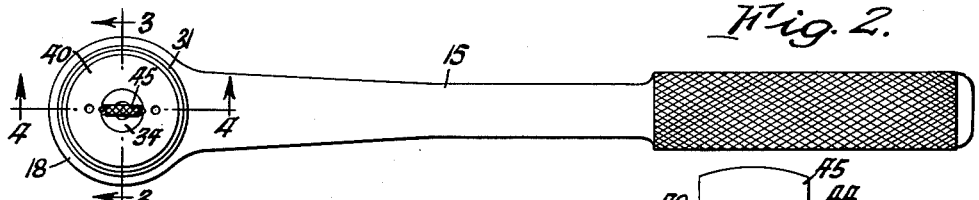
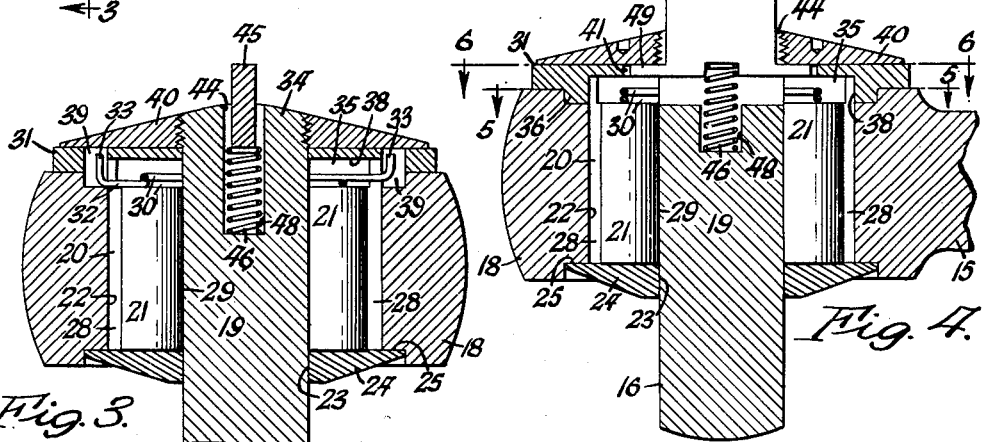
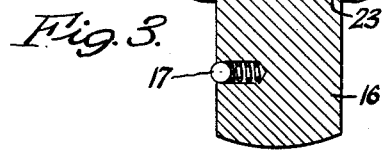
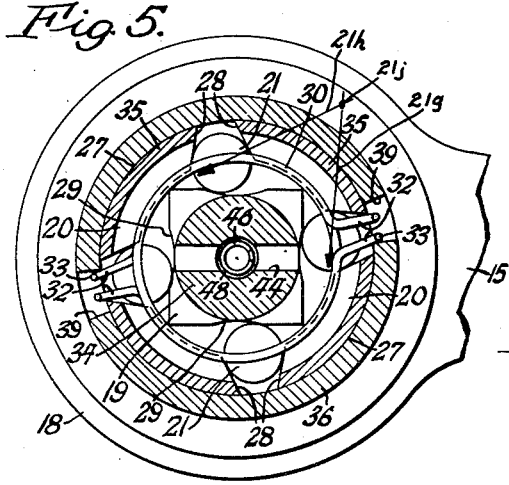
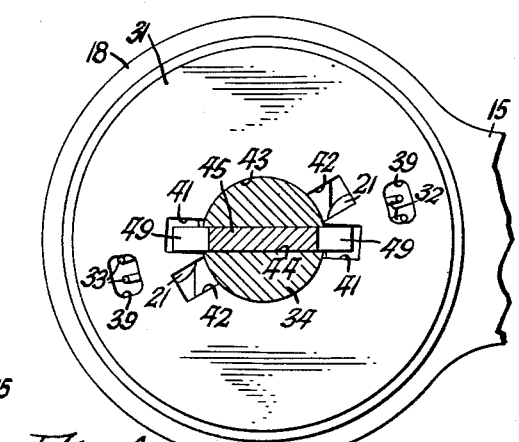

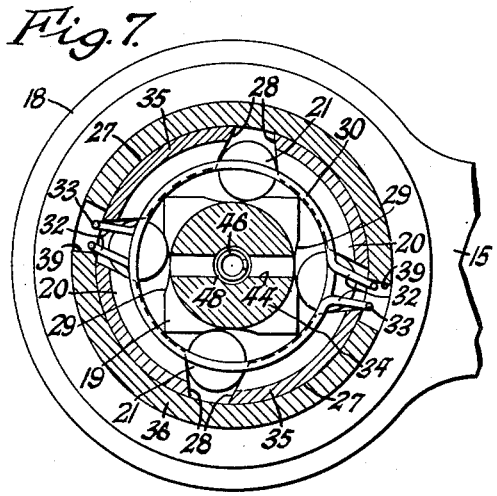
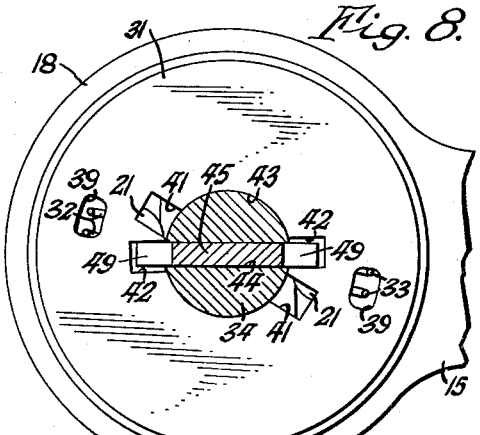
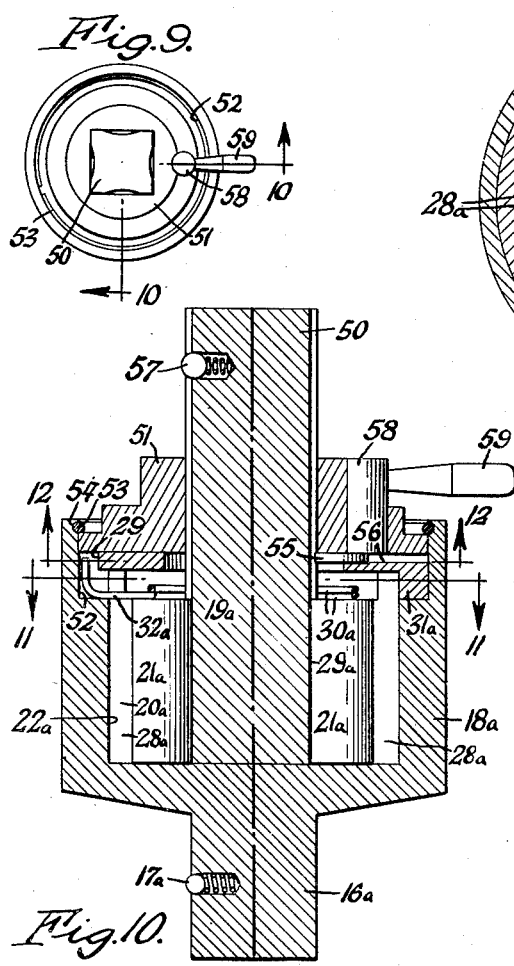
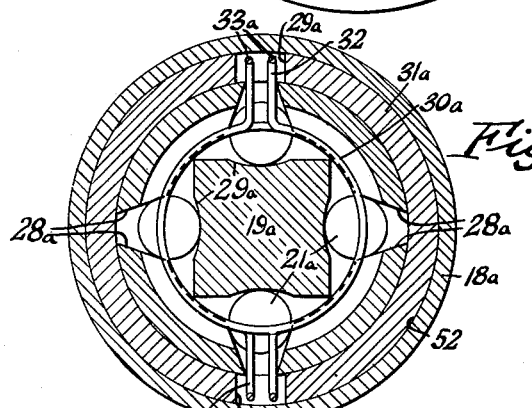
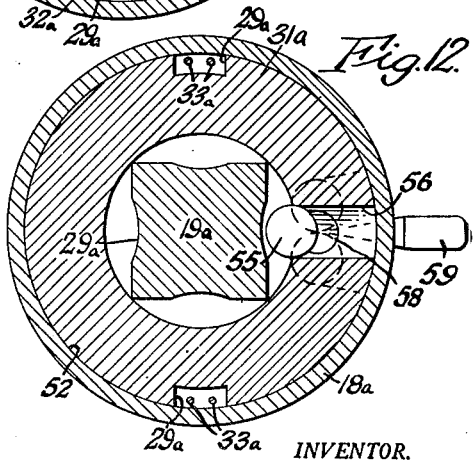

United States Patent Office 2,707,540
Patented May 3, 1955

2,707,540

FRICTION CLUTCH

Harry C. Morris, Erie, Pa.

Application February 27, 1951, Serial No. 212,997

2 Claims. (Cl. 192—45.1)

This invention relates to improvements in friction clutches operatively interposed between relatively movable parts where it is desired to obtain operable engagement in one direction at a time.

Friction clutches of this type are known but have proven unsatisfactory and have not found commercial acceptance principally because of the inability to transmit high torque without slippage from one to the other of the movable parts between which the friction clutch is operatively interposed. For example, a ratchet type wrench, prior to the advent of the present invention, was still the commercially accepted standard for a one-way oscillatable handle type wrench since all attempts to exploit a wrench of this type embodying a friction clutch mechanism in lieu of the ratchet mechanism proved singularly unsuccessful. This was due to the fact that the friction clutch mechanism slipped when high torque was applied to the wrench handle. A ratchet mechanism in a one-way wrench is undesirable since in reversing the direction of movement of the wrench handle during oscillation thereof, there is considerable lost motion in moving the ratchet dog from one ratchet tooth into an operative relation with another ratchet tooth. Thus, a ratchet-type wrench is useless when attempted to be used in a restricted space where the space is insufficient to permit the handle to be moved through the necessary arc to effect one-way clutching action of the wrench. To minimize this disadvantage the number of ratchet teeth had been increased but this generally required also enlarging the ratchet mechanism in order to strengthen each ratchet tooth.

In wrenches utilizing a clutch where only two shoes are used and the radius of curvature of the shoes is greater than the radius of curvature of the brake is greater than that of the drum, in order for the shoes to be insertable into the drum the length of the shoe must be reduced. Since the ends of the shoe will engage the inside of the drum, there will be a substantial clearance between the central portion of the periphery of the shoe and the inside of the drum. With round cams, the forces applied to the shoes by the cams will be perpendicular to the end faces of the shoes. With a brake having a two shoe assembly these lines will never intersect regardless of the angle of the cam face the vectors representing the forces will diverge and the shoes will bend under load until every element thereof engages the drum. With a form shoe assembly, when the radius of curvature of the shoes is greater than that of the drum, a much lesser clearance results between the shoe peripherial surface and the drum. Since the vectors representing the force transmitted from the cams to the shoes will intersect at the center line between the ends of the shoes, and with a proper angle on the face of the shoes as shown, a wedging action will take place between the shoes and the drum. The forces will be transmitted to the central portion of the shoes which will therefore lock themselves to the drum and will not slip on the drum. Another object of the invention is to provide a friction clutch wherein there will be no substantial deformation in the shoes thereof and therefore a more positive locking action will result between the shoes and the handle member.

Another important object is to provide such a friction clutch which will not slip under high torque.

Another object is to provide such a friction clutch which effects a clutching action directly proportional to the applied torque, that is, the higher the torque applied to the clutch the greater the frictional clutching action.

A further object is to provide such a frictional clutch mechanism which is reversible so that the one-way clutching action may be made positively operative in either direction as desired.

A further object is to provide such a friction clutch which is strong in construction and capable of receiving abusive use without liability of breakage of malfunction.

A further aim is to provide such a friction clutch which is simple in construction, compact in arrangement and size of the operating parts and can be manufactured at comparatively low cost.

Other objects and advantages of the invention will be apparent from the following description and accompanying drawings in which:

Fig. 1 is a side elevational view of a wrench embodying the present invention.

Fig. 2 is a top plan view thereof.

Figs. 3 and 4 are enlarged vertical sectional views thereof and taken on the correspondingly numbered lines of Fig. 2.

Figs. 5 and 6 are horizontal sectional views thereof and taken on the correspondingly numbered lines of Fig. 4 and showing the condition of the friction clutch for operation in one direction.

Figs. 7 and 8 are sectional views similar to Figs. 5 and 6 respectively and showing the condition of the friction clutch for operation in the opposite direction.

Fig. 9 is a top plan view of an adapter for use with a removable wrench handle and showing a modification of the invention, particularly in the reversing mechanism the operating handle of which is shown in neutral position in this figure.

Fig. 10 is an enlarged quadrant sectional view thereof and taken on line 10—10, Fig. 9.

Figs. 11 and 12 are horizontal sectional views thereof.

Fig. 13 is a side elevational view of a starter mechanism for internal combustion engines and embodying a friction clutch constructed in accordance with the present invention.

Fig. 14 is an enlarged fragmentary central longitudinal sectional view of the left hand portion of the mechanism shown in Fig. 13.

Fig. 15 is a vertical transverse sectional view thereof and taken on line 15—15, Fig. 14.

Fig. 16 is a slightly enlarged perspective view of the clutch end of the driving part of the starter mechanism shown in Fig. 14.

In the following description similar reference characters represent like parts in the various figures of the drawings.

The friction clutch forming the subject of the present invention is adapted for operative interposition between any relatively movable parts rotatable about generally the same axis regardless of their nature or character. The friction clutch is adapted for use where it is desired to prevent the driving parts and the driven part from moving relatively to each other in one direction and yet permit relative movement of these parts in the opposite direction.

*Figures 1–8*

In the wrench embodiment of my invention illustrated in Figs. 1–8, the driving part is the wrench handle 15 and the driven part or part to be turned is the stem 16. This stem 16 is shown as being substantially square in cross-section and on one side provided with a spring loaded ball detent 17 of conventional form. This stem 16 is adapted to be inserted in an opening of generally similar cross-sectional form provided in a conventional snap on socket (not shown) and the detent 17 cooperates with said socket to retain the same on the stem in the usual manner. If desired, of course, the stem 16 can be formed integrally with a wrench socket.

The friction clutch operatively interposed between the handle 15 and stem 16 comprises an outer member 18, an inner member 19, a plurality of shoe members 20 and a plurality of circular wedge members in the form of rollers 21. Four shoe members 20 and four rollers 21 are shown.

The outer member 18 is shown as being formed integrally with the handle 15 and is provided with a cylindrical inner surface 22 which surrounds the inner member 19. This inner member 19 is shown as being formed integrally with the stem 16 and as a vertical extension thereof. The inner member 19 is mounted on the outer member 18 for rotation about the vertical axis of the cylindrical inner surface 22. For this purpose the inner member 19 and integral stem 16 extends vertically through a square opening 23 provided centrally in a disk shaped plate 24 which seats on a downwardly facing shoulder 25 provided by a coaxial counterbore in the outer member 18 at the lower end of the cylindrical surface 22 thereof. The outer peripheral face of the plate 24 closely engages the cylindrical side wall of this counterbore and thus the plate 24 is rotatably mounted on the outer member 18. To prevent axial movement of the plate 24 downwardly relative to the inner member 19, the corners of the latter are upset immediately below the lower surface of the plate 24 so as to provide outwardly turned lugs as indicated at 26 in Fig. 1 which engage said lower surface at the corners of the opening 23, although any other suitable manner of preventing such relative movement can be employed.

The rollers 21 and shoe members 20 have their lower ends engaging the upper or inner flat surface of the plate 24. Each of the four rollers 21 shown is in the form of an elongated cylinder and one of these rollers is arranged opposite each of the four sides of the inner member 19. One of the shoe members 20 is arranged between each adjacent pair of rollers 21. Each shoe member 20 is arcuate in shape having an outer cylindrical face 27 which engages the inner cylindrical surface 22 of the outer member 18 and is of such circumferential extent that the opposing vertical end faces 28 of any adjacent pair of shoe members engage the corresponding intermediate roller 21 on opposite sides thereof as shown in Fig. 5. The opposing end faces 28 are convergently inclined toward each other in a radially outward direction so that movement of the intermediate roller 21 outwardly in a radial direction tends to force the shoe members 20 outwardly. This operates to force the outer cylindrical faces 27 of the shoe members 20 more firmly into engagement with the cylindrical surface 22 of the outer member 18. While the outer portions of the rollers 21 are so embraced by the adjacent shoe members 20, the inner portion of each roller projects inwardly toward the corresponding side of the inner member 19.

An important feature of the invention is the provision of a concave cam face 29 on each of the four sides of the inner member 19 which engages with the corresponding roller 21. Each concave cam face 29 extends vertically the length of the rollers 21 and is formed about an axis parallel with the corresponding roller and intersects with the corresponding flat side face of the inner member 19 so as to leave a substantial corner portion on this inner member at each corner thereof. The concave faces 29 are shown as extending the full length of the inner member 19 and its integral stem 16 to facilitate manufacture as by milling out these concavities.

Referring to Fig. 5, it will be noted that with the rollers 21 arranged at the corresponding ends of their concave cam faces 29 when the handle 15 is moved in a counterclockwise direction relative to the inner member 19 these cam faces will force the rollers outwardly which in turn tends to spread the shoe members 20 thereby to force the same into firm frictional engagement with the outer member 18 whereby the inner and outer members are effectively clutched. However, when the handle 15 is moved in the opposite direction or clockwise relative to the inner member, it will be seen that the rollers 21 will tend to move toward the centers of their concave cam faces 29 and this will relieve the pressure of the shoe members 20 on the outer member 18 and permit slippage therebetween whereby the handle 15 can turn relative to the inner member 19. A reversal of this operative arrangement is illustrated in Fig. 7 due to the rollers 21 being arranged at the opposite ends of their concave cam faces 29, that is, clutching is effected when the handle 15 is turned clockwise relative to the inner member 19 and slippage is permitted when the handle turns counterclockwise relative to the inner member.

It will further be noted that the force exerted between each concave cam face 29 and the corresponding roller 21 is in a direction normal to the tangent through the line of contact between this cam face and roller. This line of force is directed farther to one side of the vertical central axis of rotation of the inner member 19 than if the cam face 29 were flat or convex so that such line of force has a greater lever arm, that is, the perpendicular distance between the line of force and the vertical central axis of the inner member 19. This means that for a given force exerted by each roller on the corresponding concave cam face a greater torque is applied to the inner member 19 to turn the same. It follows therefore that the shorter the radius of the concave cam face coupled with as great an offset of the roller from the center of this concave cam face as is practical, the greater will be the lever arm of the line of force which passes through the point of contact between the roller and cam face and hence the great efficiency or holding power of the clutch. However, practical considerations such as the strength of the corner portions of the inner member and the size and number of the rollers must be balanced in the design of a particular clutch embodying the present invention.

Means are provided for shifting the rollers 21 toward one or the other corresponding ends of the concave cam faces 29 and also for maintaining the shoe members 20 against the outer member 18 and the rollers 21 against these shoe members and the cam faces. While such means may be variously constructed, they are shown as comprising a spring member 30 and a reversing member 31 cooperating therewith and mounted for rotation relative to the inner member 19 about the vertical central longitudinal axis thereof. Two such spring members 30 are illustrated although this is not necessary and each is shown in the form of a one piece wire bent into circular form and having its opposite end portions adjacent each other and bent radially outwardly to provide closely spaced arms 32, 32. The outer ends of these arms 32 are shown as turned or bent upwardly to provide shift fingers 33. The spring members 30 are arranged one above the other immediately above the rollers 21 and are angularly offset about 180° one from the other so that the respective pairs of spring arms 32 are diametrically opposite each other. The circular portions of the spring members 30 surround an upward integral cylindrical extension 34 on the upper end of the inner member 19. Each pair of adjacent spring arms 32 extends radially outwardly through the space between an adjacent pair of shoe members 20. Each shoe member 20 is shown as having an upstanding outer marginal flange 35 the end faces of which form extensions of the end faces 28 and the spring arms 32 are adapted to engage these extended end faces.

The reversing member 31 is shown as a disk having a depending annular flange 36 arranged in a counterbore 38 provided in the upper end of the outer member 18. In this manner the reversing member is journaled on the outer member for rotative or turning movement relative thereto. A pair of arcuate openings 39 are provided in the reversing member 31 diametrically opposite from each other and these openings extend vertically through the depending flange 36 as well as through the plate portion of the reversing member and radially the full width of this flange to receive the arms 32 and shift fingers 33 of the spring members 30.

It will thus be seen that if the reversing member 31 is shifted circumferentially relative to the inner member 19, one end wall of each opening 39 will engage the adjacent shift finger 33 and the spring arm 32 carrying the other shift finger which extends into this opening bears against the end face 28 of the flange 35 of the adjacent shoe member 20. In this manner slack or lost motion between the shoe members 20 and the cylindrical surface 22, between these shoe members and the rollers 21 and between these rollers and the cam faces 29, can be taken up. Also further shifting of the reversing member 31 will cause the shoe members and rollers to shift circumferentially around the inner member 19 until the rollers wedge between the shoe members the cam faces at one end thereof. One such position of the parts is shown in Figs. 5 and 6 and the position with the rollers arranged at the other ends of the cam faces is illustrated in Figs. 7 and 8.

The peripheral face of the reversing member 31 is preferably knurled to facilitate turning or shifting this member and the same is held in place by a cap plate 40. This cap plate 40 has a central hole which is threaded to screw on the upper threaded end of the extension 34.

The reversing member 31 is arranged to be locked in either of the operative positions shown in Figs. 6 and 8. For this purpose, the member 31 has slightly offset pairs of diametrically arranged notches 41 and 42 which radiate outwardly from a central opening 43 through which the extension 34 extends. The extension 34 of the inner member 19 is provided with a vertical diametral slot 44 opening to the top thereof and in which a plunger 45 is vertically movable but not rotatably arranged. A spring 46 is arranged between the lower or inner end of this plunger 45 and the bottom of a recess 48 in the bottom of the slot 44 and serves to constantly urge the plunger upwardly. The lower or inner end of the plunger 45 has a pair of radially outwardly extending locking elements or lugs 49, 49 arranged diametrically opposite each other. These lugs 49 are adapted to move vertically through the notches 41 and 42 but are normally urged upwardly by the spring 46 so that the upper faces of these lugs engage the lower surface of the cap plate 40.

Referring to Fig. 6 the lugs 49 are shown arranged in the notches 41 and interlock therewith to prevent rotation of the reversing member 31 relative to the extension 34 and hence the inner member 19. To reverse the operative condition of the clutch shown in Figs. 5 and 6 to that shown in Figs. 7 and 8, it is merely necessary to press the plunger 45 down to move the lugs 49 out of the notches 41 to a position below the lower surface of the center portion of the reversing member 31 and thereafter turn the reversing member in a clockwise direction from the position thereof shown in Fig. 6 to that shown in Fig. 8. This brings the lugs 49 into registry with the notches 42 and the spring 46 will move these lugs upwardly into these notches to lock the reversing member against rotative movement relative to the inner member 19. When turning the reversing member it is not necessary to hold down the plunger 45 all the time since the lugs 49 thereof will catch on the bottom of this member and ride on it until the lugs 49 register with the notches 41 or 42 at which time the spring 46 will snap the lugs into the appropriate set of notches.

As previously described, angular displacement of the reversing member 31 shifts the openings 39 and the spring members 30, all to the end of shifting the rollers 20 from one to the other ends of their concave cam faces 29 and at the same time eliminating all lost motion between these rollers and the shoe members 20 and the surfaces engaged by these parts. Thus the clutch device is rendered operative for clutching and declutching action depending upon the direction in which the wrench handle 15 is turned.

*Figures 9–12*

The form of invention embodied in the adapter shown in Figs. 9–12 involves the same essential features of the device shown in Figs. 1–8, except for a slightly different arrangement of the parts and a modified form of reversing mechanism. Where similar or equivalent parts are shown they are distinguished by the suffix *a* in Figs. 9–12.

In Figs. 9–12, the driving part is the stud 50 which is formed as an upward extension of the inner member 19a and the driven part or part to be turned is the stem 16a. The stud 50 is adapted to be inserted into an opening in a removable wrench handle (not shown) and retained thereon by the detent 57, and the stem 16a is adapted to be inserted into a socket (not shown) and retained thereon by the detent 17a.

The stem 16a is shown as an integral downward axial central extension from the base of a cup shaped housing or outer member 18a which has a cylindrical recess 22a opening to the top of this housing. The inner member 19a is arranged centrally within this cylindrical recess 22a and coaxially therewith. Four rollers 21a and four shoe members 20a are alternately arranged around the inner member 19a so that one roller 21a is opposite a concave cam face 29a formed on the side of the inner member.

The inner member 19a is shown as journaled on the housing or outer member 18a by a collar 51 the peripheral margin of which engages a counterbore 52 in the outer member at the upper end of the recess 22a. The collar 51 which is fast to the inner member 19a is retained in the counterbore 52 by a split ring 53 which is partially arranged in an annular groove 54 in the side wall of the counterbore 52.

An annular reversing member 31a surrounds the inner member 19a and is arranged immediately below the collar 51 and is also journaled in the counterbore 52. This reversing member 31a has a pair of diametrically oppositely arranged notches or openings 29a in its periphery. The arms 32a and shift fingers 33a of spring members 30a are received in the notches 29a. Two superposed spring members 30a are shown as arranged between the rollers 21a and the central disk portion of the reversing member 31a, the circular portions of these springs surrounding the inner member 19a.

To move the reversing member 31a relative to the inner member 19a, a flat cylindrical reversing cam 55 is shown as arranged in a radial slot 56 of substantially the same width and provided in the upper surface of the reversing member 31a. This reversing cam 55 is eccentrically mounted on the lower end of a vertical spindle 58 which is journaled on the collar 51. An operating handle 59 extends radially outwardly from the upper end of the spindle 58.

Referring to Fig. 12, the reversing cam 55 is shown in a neutral position. In this position the spring arms 32a engage the outwardly convergent end faces 28a of the adjacent shoe members 20a and the shift fingers 33a are held out of contact with radial sides of the notches 29a. However, if the operating handle 59 is swung in either direction from this neutral position the cam 55 will work in the slot 56 so as to shift the angular position of the reversing member 31a. This will bring one radial side of the notches 29a into engagement with the adjacent shift finger 33a and lift the corresponding spring arm 32a off its end face 28a and urge the other spring arm 32a of this pair to move circumferentially. This operates to shift the rollers 21a and shoe members 20a until the rollers jam against one end of the cam faces 29a and thereby render the clutch operative in one direction. Swinging the operating handle 59 in the opposite direction will render the clutch operative for the other direction. In either of these operative positions the disposition of the reversing cam 55 in the slot 56 is such that the line of contact therebetween is laterally outside in a radial direction of the axis of the spindle 58 whereby the cam is held in a past dead center position.

Apart from the structural and functional differences discussed above, the operation of the clutch device shown in Figs. 9–12 is similar to that shown in Figs. 1–8.

While any corresponding number of rollers and shoe members may be used, there is an advantage to be noted for the use of at least four rollers and shoe members. It will be appreciated that it is difficult to form the outer peripheral surfaces of the shoe members 20 or 20a with the same radius as the cylindrical surface 22 or 22a engaged thereby to provide perfect contact between these surfaces. Since the shoe members 20 or 20a have an arcuate extent less than that subtended by a 90° angle of the cylindrical surface 22 or 22a, the outer peripheral surfaces of these shoe members can advantageously be formed about a radius slightly greater than that of the surface 22 or 22a. When the radius of the working face of the shoe members is from .002 to .010 inch longer than the radius of the surface engaged thereby, each shoe member has two contact places at its opposite ends. Besides giving greater contact and hence holding power than if the peripheral faces of the shoe members were formed about a radius less than that of the cylindrical surface 22 or 22a, rocking action of the shoe members is eliminated. As wear occurs on the shoe members, the area of contact increases until the full circumferential extent of their peripheral faces is utilized to engage the opposing cylindrical surface.

Figures 13–16

In Figs. 13–16, a starter mechanism for internal combustion engines is shown and embodies another form of the friction clutch forming the subject of the present invention. As is well known, a starter mechanism of this type is operatively interposed between the starter motor, usually an electric motor, and the flywheel of the internal combustion engine. Such a starter mechanism preferably should include a clutch mechanism which is operative in one direction of rotation of the driving part of the starter mechanism and inoperative in the opposite direction so that when the engine starts the driving pinion can override.

Referring to Fig. 13, the numeral 70 represents a pinion having formed at one end thereof the integral cup-shaped housing 71. A drive shaft 72 is shown as being arranged coaxially with the pinion 60 and at one end carries the usual annular collar 73 for receiving the forked end of the usual actuating lever (not shown). As is conventional with a mechanism of this type the actuating lever (not shown) is adapted to move the starter mechanism as a unitary structure to the left as viewed in Fig. 13 on a splined shaft (not shown), the usual spring 74 surrounding the shaft 72 and being interposed between the collar 73 and a part of the mechanism connected to the pinion 70.

The form of friction clutch embodying my invention is shown as being operatively interposed between the pinion 70 serving as the driven part and the shaft 72 serving as the drive part. The cup-shaped housing 71 serves as the outer member of my friction clutch device and is formed with a cylindrical inner surface 75. The inner member 76 of the friction clutch device is formed as an integral extension on one end of the shaft 72 and is formed with a cylindrical outer surface 78. An outwardly extending annular flange 79 is shown as being formed integrally at the juncture between the inner member 76 and the shaft 72. The annular flange 79 is arranged within the bore of the housing and engages the inner surface 75 thereof. Because of the concentricity of the shaft 72, inner member 76 and annular flange 79, the cylindrical outer surface 78 of this inner member is concentric with and uniformly spaced from the cylindrical inner surface 75 of the outer member 71.

In the annular space so provided between the opposing cylindrical surfaces 75 and 78, are arranged four similar shoe members 80 as shown in Fig. 15. The opposing end faces 81 of these shoe members 80 are spaced apart and are convergently inclined toward each other in a radially outward direction. Between each pair of end faces 81 is arranged a circular wedge member in the form of a ball 82.

Each ball 82 is shown as arranged in a recess 83 provided in the inner member 76 and opening to the cylindrical outer surface 78 thereof. Each recess 83 is preferably in the form of a cylindrical groove the axis of which extends perpendicularly to the axis of the cylindrical inner member 76. This provides a groove of varying depth with respect to the cylindrical surface 78 of the inner member 76. The end wall at the deeper end of each groove or recess 83 is spherical and the radius of this end wall as well as the main portion of the groove is equal to the radius of the corresponding ball 82 seated therein. In this manner the balls 82 are seated along the circumferential line of engagement between the ball and the corresponding groove or recess 83 as shown in Fig. 4 but the length of this line of engagement varies depending upon the position of the ball relative to its groove.

Referring to Fig. 15 it will be seen that the nearer the balls 82 are toward the deeper ends of their respective grooves or recesses 83, the more retracted the balls are with respect to the cylindrical outer surface 78 of the inner member 76. However, the nearer the balls 82 are toward the shallower ends of their respective grooves or recesses 83, the more the balls protrude from the surface 78. When the balls 82 are arranged at the deeper ends of their grooves or recesses 83, or are in their most retracted positions, they do not exert any force on the end faces 81 of the shoe members 80. However, as the balls 82 are caused to move toward the shallow ends of their grooves or recesses 83 these balls move radially outwardly between the shoe members 80 and tend to spread the same. This operates to force the outer working faces of the shoe members 80 into firm frictional contact with the inner cylindrical surface 75 of the outer member 71. The more the balls 82 are so urged radially outwardly the more firmly the shoe members 80 are forced into engagement with the outer member 71. If desired, the outer cylindrical working faces of the shoe members 80 may be formed on a radius slightly longer than that for the inner cylindrical surface 75 to provide the advantages discussed in connection with the forms of the invention shown in Figs. 1–12.

In operation, when the starter motor (not shown) is energized the shaft 72 and inner clutch member 76 are rotated in a counterclockwise direction as viewed in Fig. 15. Since the outer member 71 resists rotation due to engagement of the pinion 70 and the flywheel (not shown) and there is a slight drag between the shoe members 80 and the outer member 71, these shoe members tend to shift circumferentially about the inner member 76 in a clockwise direction. This causes the balls 82 to move toward the shallow ends of their grooves or recesses 83 and in doing so these balls are urged radially outwardly thereby in turn forcing the shoe members 80 into firm frictional engagement with the outer member 71. In this manner the inner and outer members 76 and 71 respectively are effectively clutched and the driven outer member is forced to rotate with the driving inner member. It will be noted that the more resistance the outer member 71 offers to turning, the more the balls 82 are forced outwardly and the greater the clutching action.

When the internal combustion engine starts it will tend to rotate the pinion 70 and hence the outer member 71 faster than the shaft 72 and inner member 76 are being driven. At this time the pinion 70 should be disengaged from the flywheel (not shown) but in case this is not done promptly, the clutch mechanism will override. Under such circumstances the outer member 71 moves in a counterclockwise direction relative to the inner member 76 and this causes the shoe members 80 to shift circumferentially about the inner member 76 thereby to move the balls 82 toward the deeper ends of their grooves or recesses 83. This relieves the pressure between the opposing working faces of the shoe members 80 and the outer member 71 and slippage therebetween ensues thereby permitting the outer member 71 to rotate relative to the inner member 76 in a clockwise direction as viewed in Fig. 14.

It will be noted that the balls 82 are stopped by the spherical end walls of the grooves or recesses 83 from moving to a position where they would render the clutch operative in the opposite direction and hence the construction shown in Figs. 13–16 provides a non-reversible one-way clutch device.

A retaining ring 84 is shown as embracing the outer member 71 and as having at one end an inwardly tapered section 85 fitting over a tapered section of this outer member and at its other end having an inwardly turned flange 86 which fits against the end face of the outer member and also the outer end face or shoulder of the annular flange 79 on the shaft 72. Thus the retaining ring 84 holds the inner and outer clutch members assembled together.

From the foregoing it will be seen that the present invention provides a highly efficient design of one way friction clutch device of tremendous holding power which quickly releases its hold or clutch when actuated in the inoperative direction. Further, such clutch mechanism is compact, sturdy and relatively inexpensive to manufacture.

I claim:

1. A friction clutch, comprising an inner member, an outer member having a cylindrical surface surrounding said inner member and spaced therefrom, at least four shoe members arranged at circumferential intervals in the space between said inner and outer members, an arcuate outer face on each of said shoe members and adapted to frictionally engage said cylindrical surface, the radius of said arcuate outer faces being slightly greater than the radius of said cylindrical surface, the opposing end faces of adjacent shoe members being convergently inclined toward each other in a radially outward direction at an angle with the periphery of the shoe members, a cam face on said inner member for each pair of said convergent end faces, and a roller wedge member engaging each of said cam faces and the corresponding pair of said convergent end faces said angle being such that the vector lines representing the forces transmitted between the wedge members and the shoe members intersect adjacent the engaging surface of the shoe members with the outer member, whereby relative movement between said inner and outer members in one direction tends to wedge said wedge members between said shoe members and force those portions of said outer faces of said shoe members adjacent the ends thereof into frictional engagement with said cylindrical surface.

2. A one way non-reversible friction clutch, comprising an inner member having an outer cylindrical surface, an outer member having an inner cylindrical surface concentric with and spaced from said outer cylindrical surface, at least four arcuate shoe members arranged at circumferential intervals in the annular space between said surfaces, the outer faces of said shoe members being adapted to frictionally engage said inner cylindrical surface, the radius of said outer faces being slightly greater than the radius of said inner cylindrical surface; the opposing end faces of adjacent shoe members being convergently inclined toward each other in a radially outward direction at an angle with the periphery of the shoe members, said inner member being provided with a cylindrical groove adjacent each pair of said convergent end faces and recessed from said outer cylindrical surface and arranged with its axis perpendicular to the axis of said outer cylindrical surface, and a ball engaging each of said grooves and the corresponding pair of said convergent end faces said angle being such that the vector lines representing the forces transmitted between each ball and shoe member, intersect on the radial center line of each shoe member, whereby relative movement between said inner and outer members in one direction tends to wedge said balls between said shoe members and force those portions ofsaid outer faces of said shoe members adjacent the ends thereof into frictional engagement with said inner cylindrical surface.

References Cited in the file of this patent

UNITED STATES PATENTS

| Number | Name | Date |
|---|---|---|
| 247,896 | Ellis et al. | Oct. 4, 1881 |
| 684,478 | Trimble | Oct. 15, 1901 |
| 1,213,303 | Valentine | Jan. 23, 1917 |
| 1,265,341 | Keller | May 7, 1918 |
| 1,502,126 | Settergren | July 22, 1924 |
| 1,859,600 | Prettyman | May 24, 1932 |
| 1,887,208 | Law | Nov. 8, 1932 |
| 1,908,742 | Farkas | May 16, 1933 |
| 2,003,155 | Pfauser | May 28, 1935 |
| 2,119,622 | Freber | June 7, 1938 |
| 2,153,988 | Padgett | Apr. 11, 1939 |
| 2,224,935 | Schultz | Dec. 17, 1940 |
| 2,561,745 | Lerch | July 24, 1951 |